US012585890B2

(12) United States Patent
Dominic et al.

(10) Patent No.: US 12,585,890 B2
(45) Date of Patent: Mar. 24, 2026

(54) SYSTEM AND METHOD FOR IMAGE GENERATION USING NEUROSCIENCE-INSPIRED PROMPT STRATEGY

(71) Applicant: Fractal Analytics Private Limited, Mumbai (IN)

(72) Inventors: Biju Joseph Dominic, Mumbai (IN); Tanya Upadhyay, Lucknow (IN); Kirtana Phatnani, Ahmedabad (IN); Jieya Rawal, Mumbai (IN)

(73) Assignee: Fractal Analytics Private Limited, Mumbai (IN)

( * ) Notice: Subject to any disclaimer, the term of this patent is extended or adjusted under 35 U.S.C. 154(b) by 0 days.

(21) Appl. No.: 18/792,117

(22) Filed: Aug. 1, 2024

(65) Prior Publication Data
US 2025/0265424 A1 Aug. 21, 2025

(51) Int. Cl.
| | |
|---|---|
| *G06F 7/00* | (2006.01) |
| *G06F 40/40* | (2020.01) |
| *G06T 7/00* | (2017.01) |
| *G06T 11/00* | (2006.01) |

(52) U.S. Cl.
CPC ............ *G06F 40/40* (2020.01); *G06T 7/0002* (2013.01); *G06T 11/00* (2013.01); *G06T 2207/30168* (2013.01)

(58) Field of Classification Search
CPC ....... G06F 40/40; G06T 7/0002; G06T 11/00; G06T 2207/30168
See application file for complete search history.

(56) References Cited

U.S. PATENT DOCUMENTS

| | | | | |
|---|---|---|---|---|
| 10,382,722 | B1 * | 8/2019 | Peters .................... | H04N 7/152 |
| 11,516,158 | B1 * | 11/2022 | Luzhnica ................ | G06F 40/35 |
| 12,106,205 | B1 * | 10/2024 | Jain ......................... | G06N 3/084 |
| 12,111,747 | B1 * | 10/2024 | Jain ........................... | G06F 8/41 |
| 2018/0052885 | A1 * | 2/2018 | Gaskill .................... | G06N 5/04 |
| 2021/0042662 | A1 * | 2/2021 | Pu ........................... | G06Q 50/01 |
| 2021/0076002 | A1 * | 3/2021 | Peters .................... | H04N 7/152 |
| 2023/0377226 | A1 * | 11/2023 | Saharia ................. | G06T 3/4053 |
| 2024/0095491 | A1 * | 3/2024 | Birru ....................... | H04L 51/02 |
| 2024/0203143 | A1 * | 6/2024 | Zhang ................... | G06V 10/82 |
| 2024/0282131 | A1 * | 8/2024 | Ren .................... | G06V 10/7753 |
| 2024/0295953 | A1 * | 9/2024 | Zakharov ............... | G06T 11/00 |
| 2024/0338860 | A1 * | 10/2024 | Trzyna ................... | G06F 40/44 |
| 2024/0354455 | A1 * | 10/2024 | Loy .......................... | G06F 40/40 |
| 2024/0354513 | A1 * | 10/2024 | Hong ..................... | G06N 5/022 |
| 2024/0378251 | A1 * | 11/2024 | Boyd .................... | G06F 16/958 |
| 2024/0394932 | A1 * | 11/2024 | Chemerys ................ | G06T 5/60 |

(Continued)

*Primary Examiner* — Mohammed R Uddin
(74) *Attorney, Agent, or Firm* — Wiley Rein LLP

(57) ABSTRACT

Systems and methods for neuroscience-based prompt strategy generation may create more effective prompts, leading to more successful and user-friendly interactions with large language models (LLMs). The systems and methods may consider factors including, but not limited to, evolutionary category needs, strongest emotional memories, usage context, brand guidelines, and/or photographic details. The system may include a plurality of modules that may work together to effectuate neuroscience-based prompt strategy. These modules include an analytics engine, a contextualized prompt generation module, an images generator module, and a governance module.

10 Claims, 2 Drawing Sheets

(56)          References Cited

U.S. PATENT DOCUMENTS

| | | | |
|---|---|---|---|
| 2024/0404514 A1* | 12/2024 | Rollwage | A61B 5/4803 |
| 2024/0404687 A1* | 12/2024 | Bell | G06Q 10/0633 |
| 2024/0411994 A1* | 12/2024 | Siracusano | G06F 40/205 |
| 2024/0412029 A1* | 12/2024 | Yang | G06N 3/0475 |
| 2024/0419246 A1* | 12/2024 | Ullrich | G10L 13/08 |
| 2025/0004557 A1* | 1/2025 | Ramirez-Aristizabal | G06V 40/15 |
| 2025/0036918 A1* | 1/2025 | Cruz | G06N 3/042 |
| 2025/0037422 A1* | 1/2025 | Saraee | G06V 10/40 |

* cited by examiner

SYSTEM AND METHOD FOR IMAGE GENERATION USING NEUROSCIENCE-INSPIRED PROMPT STRATEGY

FIELD OF THE DISCLOSURE

The present disclosure generally relates to prompt strategy, and more particularly to systems and methods for image generation using neuroscience-inspired prompt strategy.

BACKGROUND

The challenge with large language models (LLMs) lies in their requirement for highly specific prompts to yield desired outputs. Crafting these prompts can be a formidable task for users who often struggle to determine the precise wording or structure needed, resulting in interactions that are less user-friendly. To alleviate this problem and enhance user experiences, there is a clear need for a system that can refine prompts by considering factors such as evolutionary category needs, strongest emotional memories, usage context, brand guidelines, and/or photographic details. This system would empower users to create more effective prompts, ultimately leading to more successful and user-friendly interactions with LLMs.

SUMMARY

Embodiments of the present disclosure may provide a system for image generation using neuroscience-based prompt strategy generation comprising: an analytics engine configured to receive inputs from one or more data sources; a contextualized prompt generation module configured to receive neuroscience-informed prompts, the contextualized prompt generation module comprising one or more large language models (LLMs), an adaptive learning module configured to select one or more prompts from the one or more LLMs, and a neuroscience-informed prompt module configured to enhance the selected one or more prompts; an images generator module configured to receive prompts from the contextualized prompt generation module and generate one or more images; and a governance module configured to receive the generated one or more images and evaluate their alignment with predefined criteria, thereby configuring predefined rules, guidelines, and enforcement of ethical and quality standards, wherein outputs from the governance module may be integrated with the contextualized prompt generation module to enhance refinement of the prompts. The analytics engine may be configured to accept data selected from the group comprising: marketing analytics data, product descriptions, sales information, brand guidelines, and other related information. The neuroscience-informed prompts may incorporate one or more factors selected from the group comprising: evolutionary category needs, strongest emotional memories, usage context, brand guidelines, and/or photographic details. The neuroscience-informed prompt module may be further configured to assign customizable weights to one or more factors. The images generator module may leverage generative artificial intelligence (AI) to generate one or more images. The generative AI may offer fine-tuning options, granular control, and ability to explore various styles and compositions. The guidelines may be selected from the group comprising: content quality, ethical considerations, legal compliance, and adherence to brand guidelines. The governance module may be configured for users to input preferences, constraints, and/or customized guidelines. The integration may comprise evaluation and filtering of the prompts for potential ethical, legal, quality, brand alignment, or bias-related concerns, ensuring generated content complies with the predefined criteria. The system may further comprise a user-centric interface provided for inputting the preferences, constraints, and/or customized guidelines.

Other embodiments of the present disclosure may provide a method for neuroscience-based prompt strategy comprising: using an analytics engine, receiving inputs from one or more data sources; selecting one or more prompts from one or more large language models (LLMs) within a contextualized prompt generation module; enhancing the selected one or more prompts; receiving the enhanced selected one or more prompts to generate one or more images; evaluating alignment of the one or more images with predefined criteria to produce an output, thereby configuring predefined rules, guidelines, and enforcement of ethical and quality standards; and integrating the output within contextualized prompt generation module to enhance refinement of the prompts. The method may include storing the output in an image display; and displaying the output. The displaying step also may include sensitizing, testing, and integrating the output. The method also may include performing marketing analytics on the displayed output. The analytics engine may be configured to accept data selected from the group comprising: marketing analytics data, product descriptions, sales information, brand guidelines, and other related information. The one or more prompts may incorporate one or more factors selected from the group comprising: evolutionary category needs, strongest emotional memories, usage context, brand guidelines, and/or photographic details. The method also may include assigning customizable weights to the one or more factors. Generative artificial intelligence (AI) may be leveraged to generate the one or more images, the generative AI configured to offer fine-tuning options, granular control, and ability to explore various styles and compositions. The guidelines may be selected from the group comprising: content quality, ethical considerations, legal compliance, and adherence to brand guidelines. The integrating step may further include evaluating and filtering the prompts for potential ethical, legal, quality, brand alignment, or bias-related concerns, ensuring generated content complies with the predefined criteria.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide systems and methods for image generation using neuroscience-inspired prompt strategy that may create more effective images, leading to more successful and user-friendly interactions with large language models (LLMs). The systems and methods according to embodiments of the present disclosure may consider factors including, but not limited to, evolutionary category needs, strongest emotional memories, usage context, brand guidelines, and/or photographic details.

Figure 1:
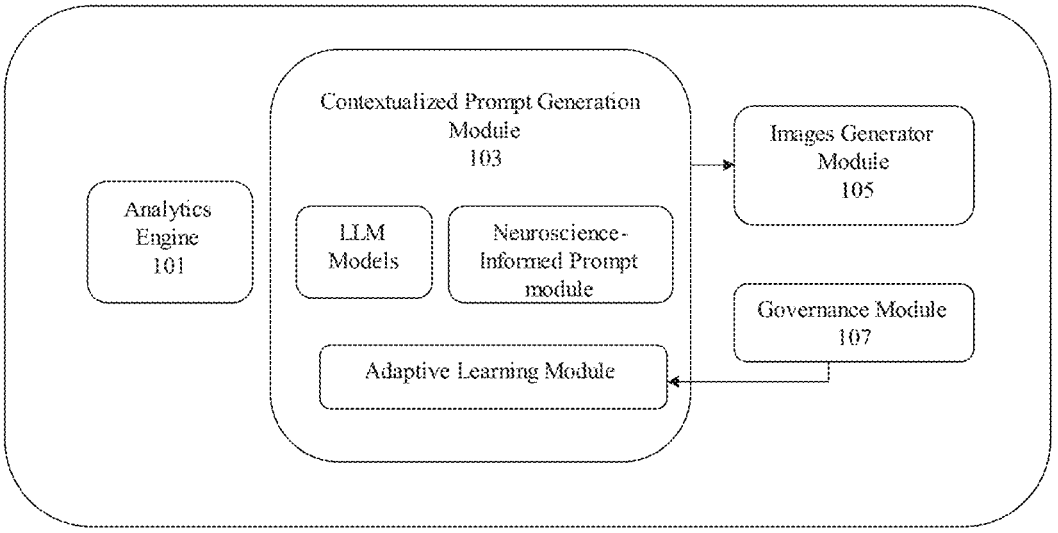
FIG. 1 depicts a system for image generation neuroscience-inspired prompt strategy according to an embodiment of the present disclosure.

FIG. 1 depicts a system for image generation neuroscience-inspired prompt strategy according to an embodiment of the present disclosure. The system may include a plurality of modules that may work together to effectuate neuroscience-image generation prompt strategy. These modules include analytics engine 101, contextualized prompt generation module 103, images generator module 105, and governance module 107. Each of these modules are described in more detail below.

Analytics engine 101 may be configured to receive inputs from one or more data sources. Further, analytics engine 101 may be configured to ingest inputs in a structured format from tabular SQL databases and tables. Simultaneously, engine 101 may be configured to handles unstructured data, including textual content and images. For structured data, it may employ advanced parsing techniques to navigate tables and SQL databases, while for unstructured data, it may leverage natural language processing (NLP) for textual information and computer vision methodologies for image data. This multifaceted approach ensures a robust and technically sophisticated process for data ingestion, enabling analytics engine 101 to derive intricate insights from a diverse array of information formats across a wide range of information sources. In an embodiment of the present disclosure, analytics engine 101 may be tailored to accept various types of data, including but not limited to, marketing analytics data, product descriptions, sales information, brand guidelines, and/or other related information.

Contextualized prompt generation module 103 may include one or more LLMs, a neuroscience-informed prompt module, and an adaptive learning module. Contextualized prompt generation module 103 may be configured to receive inputs in the form of neuroscience-informed prompts. These specialized prompts may incorporate and implement insights from the field of neuroscience to guide the generation process, drawing from a plurality of key factors including, but not limited to, evolutionary category needs, strongest emotional memories, usage context, brand guidelines, and/or photographic details. The neuroscience-informed prompts may provide a template for the prompting information that needs to be provided to the image generation AI. Module 103 may employ advanced techniques to interpret and incorporate these inputs into the prompt generation process, resulting in content that may align with human cognition and emotional responses, and specific contextual requirements. Leveraging advanced technologies such as deep learning, with billions of parameters, for tasks like Natural Language Processing, Sentiment Analysis, and pattern recognition, module 103 may generate coherent and contextually relevant responses in a natural language format. This output is aptly suited for subsequent use by the image generation module. This integration may tailor the generated content to human cognition, emotions, ethical standards, and/or specific contextual demands, enhancing the precision and relevance of the generated outputs.

Contextualized prompt generation module 103 may include an adaptive learning module that may be configured to select one or more prompts from one or many LLMs based on neuroscience-informed prompt strategy. This adaptive learning capability may be configured to employ a neuroscience-informed prompt strategy, enabling the module to intelligently select prompts that align with cognitive principles. By incorporating insights from neuroscience, the module may refine its prompt selection process, optimizing the interaction with LLMs. This advanced technique may ensure a more nuanced and contextually relevant generation of prompts, elevating the overall performance of module 103. Further, the prompt selection may further be enhanced by the governance module, which may play a pivotal role in ensuring that the ethical, corporate, and legal standards are upheld in the generated outputs. By incorporating this governance mechanism, the module may ensure that the generated content adheres to predefined standards, promoting responsible and compliant outputs in alignment with ethical, corporate, and legal guidelines. This synergistic approach may elevate the reliability and ethical integrity of the generated prompts. The adaptive learning module may be designed to work in conjunction with multiple LLMs within contextualized prompt generation module 103 in embodiments of the present disclosure.

The neuroscience-informed prompt module within contextualized prompt generation module 103 may be configured to enhance prompts by considering key factors, including, but not limited to, evolutionary category needs, strongest emotional memories, usage context, brand guidelines, and/or photographic details. This enhancement process may involve a multifaceted consideration of key factors, which goes beyond conventional approaches. These factors include, but are not limited to:

Evolutionary Category Needs: The module delves into the fundamental requirements associated with evolutionary categories and responses, ensuring that the generated prompts resonate with inherent human cognitive patterns and preferences.

Strongest Emotional Memories: Leveraging insights from neuroscience, the module identifies and incorporates elements that tap into individuals' strongest emotional memories, creating images that evoke deep and meaningful responses.

Usage Context: Understanding the context in which the image and category will be utilized is paramount. The module adapts its enhancement techniques to align with the specific usage context, whether it be for creative endeavors, information retrieval, or other applications.

Brand Guidelines: The adherence to brand guidelines is crucial for maintaining consistency and identity. The module considers brand-specific elements, ensuring that the generated images align seamlessly with established brand guidelines and values.

Photographic Details: For prompts related to visual content, the module pays meticulous attention to photographic details. This involves understanding and incorporating nuances related to composition, color schemes, and other visual elements, enhancing the overall visual appeal of the generated.

By incorporating these nuanced considerations, the neuroscience-informed prompt module not only refines the cognitive and emotional impact of the prompts but also ensures a harmonious integration with diverse contextual, brand, and visual requirements. This results in a highly adaptive and sophisticated prompt enhancement process within module 103.

Evolutionary category needs may relate to understanding the fundamental human needs related to the topic at hand to create prompts that resonate with users on a primal level. Strongest emotional memories may leverage knowledge of the emotions most strongly associated with the subject to elicit deep emotional responses in users. Usage context may adapt prompts to the specific context or situation in which they will be used, ensuring relevance and effectiveness. Brand guidelines may incorporate brand-specific guidelines to maintain consistency and brand identity in generated content. Photographic details may consider visual elements and details to inspire prompts that complement and enhance visual content, such as images or graphics, effectively. The neuroscience-informed prompt module may be configured to assign customizable weights to the one or more factors. Users can assign weights to prioritize prompts that align with specific evolutionary category needs, allowing for a fine-tuned balance between adherence to cognitive patterns and other considerations. The module allows users to assign weights to the usage context, recognizing that the relevance of prompts may vary across different scenarios. This adaptability ensures that prompts are optimally tailored to their intended context. Further, customizable weights may offer control over the adherence to brand guidelines. Users can adjust the importance of aligning prompts with specific brand elements, ensuring consistency while accommodating variations based on branding priorities. For instance, if a user assigns a higher weight to "Strongest Emotional Memories," the module may prioritize elements that are more likely to evoke emotional responses. Conversely, a lower weight would de-emphasize this factor in favor of other considerations. The module may be configured to not only enhance the adaptability of the prompt generation process but also reflect a user-centric design, empowering individuals to tailor the output according to their unique preferences, objectives, and/or contextual requirements. The result is a highly customizable and precise prompt enhancement mechanism within module 103.

Module 105 may be configured as an image generator that may utilize one or generative AI models including, but not limited to, image diffusion, that may be combined with an ensemble model of image enhancement. Images generator module 105 may be configured to receive prompts from contextualized prompt generation module 103 and generate one or more images. Module 105 may be designed as a versatile image generator, equipped with the capability to harness advanced generative AI models, including but not limited to image diffusion. This module may be configured to efficiently utilize these models and seamlessly integrate them into an ensemble model of image enhancement. This combination of cutting-edge techniques may ensure a powerful and sophisticated approach to generating high-quality images, making module 105 an effective tool in the realm of image synthesis and enhancement. High-quality, tailored images may be generated based on prompts, offering fine-tuning options, granular control, and the ability to explore various styles and compositions.

Governance layer module 107 may be configured to receive generated images and evaluate their alignment with predefined criteria that may be input and used in the model as guardrails during image processing. The predefined criteria may serve as essential guardrails during the image processing, ensuring that the generated content meets specific standards and requirements. The module may be equipped to evaluate generated images against a set of predefined criteria. These criteria encompass various aspects such as visual quality, content relevance, and adherence to specific guidelines. Further, users may have the flexibility to configure and customize predefined rules and guidelines based on their specific needs. This adaptability may allow for the seamless integration of module 105 into diverse contexts and applications. In cases where images do not meet the criteria, the governance layer module may provide feedback or corrective measures, creating a dynamic feedback loop for continuous improvement. This module may be adaptable for configuring predefined rules, guidelines, and the enforcement of ethical and quality standards. These guidelines may encompass a wide range of aspects, including, but not limited to, content quality, ethical considerations, legal compliance, and adherence to brand guidelines. Furthermore, this module can be configured to allow users to input their preferences, constraints, or customized guidelines, enabling them to tailor the generated content to their specific requirements. For example, a user-centric interface may be provided for inputting custom preferences and guidelines, allowing users to exert precise control over the content generation process, thus fine-tuning and personalizing prompts to meet their specific technical and creative requirements.

The outputs from governance layer module 107 may be seamlessly integrated with contextualized prompt generation module to enhance the refinement of prompts, ultimately guiding the image generation process. This integration may involve a two-fold approach. First, advanced algorithms may be used to evaluate and filter prompts for potential ethical, legal, quality, brand alignment, or bias-related concerns, ensuring the generated content complies with predefined criteria. The algorithms or tools may include, but are not limited to, a multimodal generative AI called VQA used for visual questions answers to perform visual analysis of the image output, a large-language model, and natural-language based software agent to memorize and store and retrieve textual brand guidelines, legal and quality guidelines. Multimodal Visual Question Answer (VQA) may investigate visuals based on textual and other visual guidelines. The VQA algorithm mat ingest guidelines for responsible AI use to scan the image for bias-related concerns. These criteria, while predefined, also may serve as a post-generation quality-check criterion for VQA and LLM software agents. Responsible AI framework may assess biases in the creatives generated, and there may be a brand guideline compressing algorithm to ingest brand communication guidelines for VQA. For example, a large language model may transform a 400-page brand book into precise key rules. A VQA agent may verify the generated image against the critical guidelines established by the LLM. A validation report may be provided. If all of the brand guidelines are met, the validation report may be sent to a legal expert or creative director, for example, to provide human expertise. If the human approves, it may be sent out for public release. If the human does not approve, revision-based critique may be prompted (i.e., instructions to auto modify the current prompt to make it adhere to the items that the human did not approve). It may then pass to Image Gen AI wherein a candidate image may be generated. It may then repeat the process starting with the VQA agent until approved. If all of the brand guidelines are not met prior to engaging human expertise, the same steps discussed with respect to the human expertise not approving may be utilized. In another example, enterprise data (i.e., demographics, products, transactions, interactions, third-party/external) may be fed to Customer 360 wherein persona markers may be identified (i.e., demographics, psychographics, behavioral markers, customer journey). A MicroStimuli framework may then be used. Domain expertise (i.e., Secondary research insights, brand guidelines, photographic detail) may lead to a dynamic prompt, or a prompt template may be used in some embodiments of the present disclosure. This dynamic prompt may feed to GenAI with a creative-gen-agent. A VQA critic agent may also be part of the Micro-Stimuli framework using GenAI. The creative-gen-agent may result in personalized creatives which may include personalized images and/or personalized copy. Feedback from these personalized creatives may regenerate comparison with reference image and guidelines and/or remove irrelevant images. Comparisons also may result from going through the VQA critic agent. An instruction-code-agent may use GenAI to create CSS+HTML code. A validation report may be generated and sent for human expertise evaluation which may also use CRM automation to approve or disapprove the report. If not approved, A/B testing and/or lift measurement may be used in embodiments of the present disclosure.

Second, a user-centric interface may be provided for inputting custom preferences and guidelines, allowing users to exert precise control over the content generation process, thus fine-tuning and personalizing prompts to meet their specific technical and creative requirements. Interfaces may include input and/or output modules. Input Modules may include, but are not limited to, a textual input module that processes and interprets textual data input by the user; a vocal input module that captures and decodes voice data input by the user, converting it into a textual format for further processing; and/or a visual input module that analyzes image data input by the user, recognizing patterns, objects, and textual information within the images. An output module converts the generated responses into a user-friendly format and delivers the responses to the user in the appropriate mode, which may include textual, vocal, or visual output. This intricate interplay of automated assessment and user-driven customization may optimize the prompt generation process, resulting in technically precise and tailored inputs for image generation.

In an exemplary embodiment of the present disclosure, the system may be configured for generation of diverse marketing materials, encompassing the creation of engaging content, including advertisement images and recipe images. These materials may be meticulously tailored to effectively promote and showcase a wide array of products, utilizing a neuroscience-based prompt strategy to enhance user engagement, comprehension, and brand recognition.

In this embodiment of the present disclosure, analytics engine 101 may be configured to receive recipe details, including ingredients and instructions on how to prepare the dish. Analytics engine 101 may be configured to receive information encompassing ingredients and instructions for preparing a dish. For structured data like recipe details, the engine may utilize its parsing capabilities to effectively extract and process information from tables or databases. This may ensure precise handling of the structured data related to ingredients and instructions. Conversely, for unstructured data, including textual content and images, the engine may leverage a combination of Natural Language Processing (NLP) techniques for textual information and computer vision methodologies for image data. This information may be utilized to create visually appealing recipe images that effectively communicate the essence of the product. Analytics engine 101 may be further configured to receive brand guidelines, and these brand guidelines may be used to ensure that the generated marketing material aligns with the established brand identity, maintaining consistency, and fostering brand recognition.

The neuroscience-informed prompt module within contextualized prompt generation module 103 may be configured to enhance prompts by considering key factors, including, but not limited to, evolutionary category needs, strongest emotional memories, usage context, brand guidelines, and/or photographic details. For instance, this may involve capturing the dish as a delectable, steaming plate of pasta to fulfill an evolutionary category need, evoking feelings of warmth and satisfaction through the aroma. In a given context, like a kitchen countertop, the dish, mushroom ragù with fusilli pasta, may be positioned alongside essential ingredients such as Knorr Mushroom Stock Pot, chestnut mushrooms, fresh baby spinach leaves, garlic cloves, chopped tomatoes, creme fraiche, water, olive oil, and grated Parmesan. The "What+Brand Guidelines" in this example may specify an overhead food photography approach for the image, following the brand's aesthetics. Photographic details may include the use of natural lighting from the top left, consistent with brand guidelines, to ensure a fresh, vibrant, and enticing appearance of the dish. Hints of green, possibly from the spinach, may be incorporated to reinforce the brand's color identity. The overall aim is to create an inviting, lived-in kitchen atmosphere while avoiding sterile or overly patterned settings.

The enhanced prompt, also referred to herein as a refined prompt, generated through the neuroscience-informed prompt module, may then be sent from contextualized prompt generation module 103 to images generator module 105. Upon receiving the prompt, images generator module 105 may generate one or more images. For example, What+Brand Guidelines may be One-pot Creamy Lemon Chicken, #008641 (knorr green), empty space on the top-left, overhead dish photography. The Evolutionary Category Need may be to indulge in a sumptuous casserole of boneless chicken thigh fillets, harmoniously paired with the tang of lemon slices and the sweetness of runny honey, magnified by the richness of reduced-fat crème fraîche. The Strongest Emotional Memory may be that every morsel reveals layers of finely chopped garlic and the herbaceous touch of oregano or thyme, enhanced by the robust flavor of Knorr Chicken Stock Pot. The dish's creaminess, combined with the zestiness of lemon, transports you to a comforting culinary experience. The Context in usage may be that this dish, positioned against a neutral, warm backdrop, encapsulates a luxurious yet homely feel, resonating with flavors that comfort the soul with each bite. Photographic details may include lighting from top left, warm, natural, daylight.

Governance layer module 107 may be configured to receive the generated images from images generator module 105 and assess their adherence to predefined parameters. These adherence measures may be preconfigured by the user based on various parameters including, but not limited to, "preconfigured dos and don'ts," input taken in from visual Q&As in the form of text or multimodal content, as well as input from food expert reviews. The output of governance layer module 107 may then be fed back into contextualize prompt generation module 103 to further refine prompts and guide image generation. For example, after refining the example described above, What+Brand Guidelines is One-pot Creamy Lemon Chicken featuring #008641 (Knorr green). Prioritize empty space on the top-left and emphasize overhead dish photography. The Evolutionary Category Need is to indulge in a sumptuous casserole of boneless chicken thigh fillets, harmoniously paired with the tang of lemon slices and the sweetness of runny honey, magnified by the richness of reduced-fat crème fraîche. The Strongest Emotional Memory is that every morsel reveals layers of finely chopped garlic and the herbaceous touch of oregano or thyme, enhanced by the robust flavor of Knorr Chicken Stock Pot. The dish's creaminess, combined with the zestiness of lemon, transports you to a comforting culinary experience. The Context in usage is captured from above against a neutral, warm backdrop, this dish encapsulates a luxurious yet homely feel, resonating with flavors that comfort the soul with each bite. The Photographic details include lighting from the top left with warm, natural daylight; overhead angle to highlight the dish's vibrant ingredients and composition.

The generated images may then be deployed through a process of sensitization, testing, and integration. Further, a sensitization phase means where generated images are exposed to various contextual factors, ensuring they align harmoniously with the intended purpose. This may involve assessing the images for their responsiveness to specific themes, emotions, or visual narratives, further refining their adaptability. The deployed images may then be subsequently subjected to marketing analytics for further refinement of the prompts and the overall image generation process. The deployed images serve as input data for analytics engine 101, where they undergo in-depth scrutiny through marketing analytics. This phase is crucial for honing and fine-tuning both the generated prompts and the overall image generation process. By analyzing the performance metrics derived from the deployment of images, analytics engine 101 may refine its understanding of audience preferences, engagement patterns, and contextual nuances. This iterative feedback loop contributes to continuous improvement, ensuring that future prompts and image generation align more precisely with the dynamic requirements of marketing and user expectations.

Figure 2:
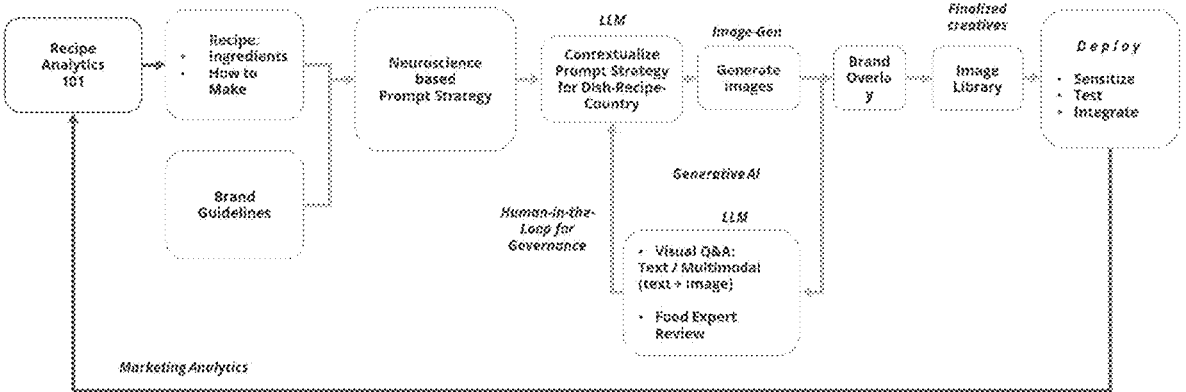
FIG. 2 depicts a process for neuroscience-based prompt strategy according to an embodiment of the present disclosure.

FIG. 2 depicts a process for neuroscience-based prompt strategy according to an embodiment of the present disclosure. As discussed herein, recipe analytics may be provided to analytics engine 101. Information may include the recipe ingredients and steps for how to make the food product as well as brand guidelines. This information may be fed into a neuroscience-based prompt strategy where the prompt strategy may be contextualized for the food product to be made, the recipe, the communication channel, including but not limited to e-mail, websites, social media advertisements and digital and non-digital display advertisements, and the required image resolutions, and the country associated with the recipe using LLMs. In governance, LLMs including visual Q&A provided through text and/or multimodal input (text and images) and/or food reviews may be used to refine the prompt strategy and results of same. Generative AI may be used in this step of the process. Images may then be generated, and a brand overlay may be performed. The finalized creatives may be stored in an image display and later displayed. Display may include steps to sensitize, test, and integrate in embodiments of the present disclosure. Marketing analytics may then be performed on what is displayed, and the process may be repeated to refine the outputs in embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:

1. A method for neuroscience-based prompt strategy comprising:
   using an analytics engine, receiving inputs from one or more data sources;
   using an adaptive learning module within a contextualized prompt generation module, selecting one or more prompts from one or more large language models (LLMs) within the contextualized prompt generation module;
   enhancing the selected one or more prompts using a neuroscience-informed prompt module within the contextualized prompt generation module;
   receiving the enhanced selected one or more prompts to generate one or more images based on prompts from the contextualized prompt generation module using an images generator module which is a versatile image generator that harnesses advanced generative AI models and integrates them into an ensemble model of image enhancement by providing fine-tuning options, granular control and a plurality of styles and compositions;
   using a governance module, evaluating alignment of the generated one or more images with predefined criteria to produce an output, thereby configuring predefined rules, guidelines, and enforcement of ethical and quality standards; and
   integrating the output within contextualized prompt generation module with the output from the governance module to enhance refinement of the prompts.

2. The method of claim 1 further comprising:
   storing the output in an image display; and
   displaying the output.

3. The method of claim 2, the displaying step further comprising:
   sensitizing, testing, and integrating the output.

4. The method of claim 2 further comprising:
   performing marketing analytics on the displayed output.

5. The method of claim 1, wherein the analytics engine is configured to accept data selected from the group comprising:
   marketing analytics data, product descriptions, sales information, brand guidelines, and other related information.

6. The method of claim 1, wherein the one or more prompts incorporate one or more factors selected from the group comprising:
   evolutionary category needs, strongest emotional memories, usage context, brand guidelines, and/or photographic details.

7. The method of claim 6 further comprising:
   assigning customizable weights to the one or more factors.

8. The method of claim 1, wherein generative artificial intelligence (AI) is leveraged to generate the one or more images, the generative AI configured to offer fine-tuning options, granular control, and ability to explore various styles and compositions.

9. The method of claim 1, wherein the guidelines are selected from the group comprising:
   content quality, ethical considerations, legal compliance, and adherence to brand guidelines.

10. The method of claim 1, the integrating step further comprising:

evaluating and filtering the prompts for potential ethical, legal, quality, brand alignment, or bias-related concerns, ensuring generated content complies with the predefined criteria.

\* \* \* \* \*